Aug. 11, 1925. Re. 16,138

J. E. POWELL

CYLINDER GRINDER

Original Filed March 21, 1922 3 Sheets-Sheet 1

Inventor:
James E. Powell,
by Pierson & Ribbens & Davis & Macauley
Attys

Aug. 11, 1925.

Re. 16,138

J. E. POWELL

CYLINDER GRINDER

Original Filed March 21, 1922 3 Sheets-Sheet 2

Inventor:
James E. Powell,
by Rector Hibben Davis & Macauley
Attys.

Aug. 11, 1925. Re. 16,138
J. E. POWELL
CYLINDER GRINDER
Original Filed March 21, 1922 3 Sheets-Sheet 3
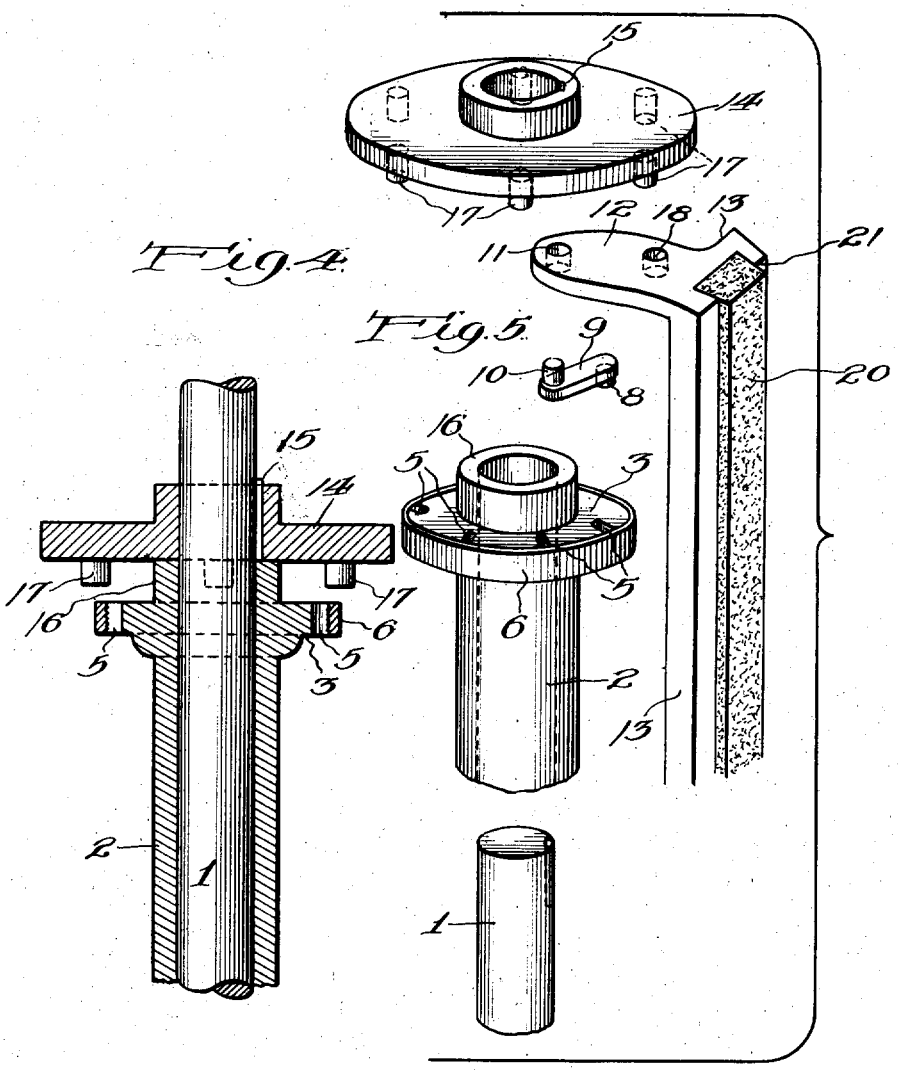
Inventor:
James E. Powell,
by Rector, Lieberstein, Harris & Macauley
Attys.

Reissued Aug. 11, 1925. Re. 16,138

UNITED STATES PATENT OFFICE.

JAMES EDWARD POWELL, OF LITTLETON, COLORADO, ASSIGNOR, BY DIRECT AND MESNE ASSIGNMENTS, OF NINE HUNDRED AND NINETY-NINE ONE-THOUSANDTHS TO THE POWELL CYLINDER GRINDER, INC., OF LITTLETON, COLORADO, A CORPORATION OF OHIO, AND ONE ONE-THOUSANDTH TO AUTOMOTIVE MAINTENANCE MACHINERY CO., A CORPORATION OF ILLINOIS.

CYLINDER GRINDER.

Original No. 1,437,548, dated December 5, 1922, Serial No. 545,557, filed March 21, 1922. Application for reissue filed November 28, 1924. Serial No. 752,824.

*To all whom it may concern:*

Be it known that JAMES EDWARD POWELL, a citizen of the United States, residing at Littleton, in the county of Arapahoe and State of Colorado, has invented certain new and useful Improvements in Cylinder Grinders, of which the following is a specification, reference being had therein to the accompanying drawing.

The invention relates to cylinder grinders, and has for its object to provide a grinder having a plurality of circumferentially arranged and longitudinally disposed stone carrying members mounted for movement away from and toward the grinder axis, and means positively connecting the several said members to equalize their said movements, whereby they will be simultaneously and uniformly expanded or contracted with respect to the grinder axis. A further object is to provide novel and advantageous construction and combination of the grinder parts.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 4 is a sectional view through the upper end of the device showing the same with the stone-carrying members removed.

Figure 5 is a detail collective view of the parts of the device at one end of the device, showing the same in position for assembly.

Figure 1:
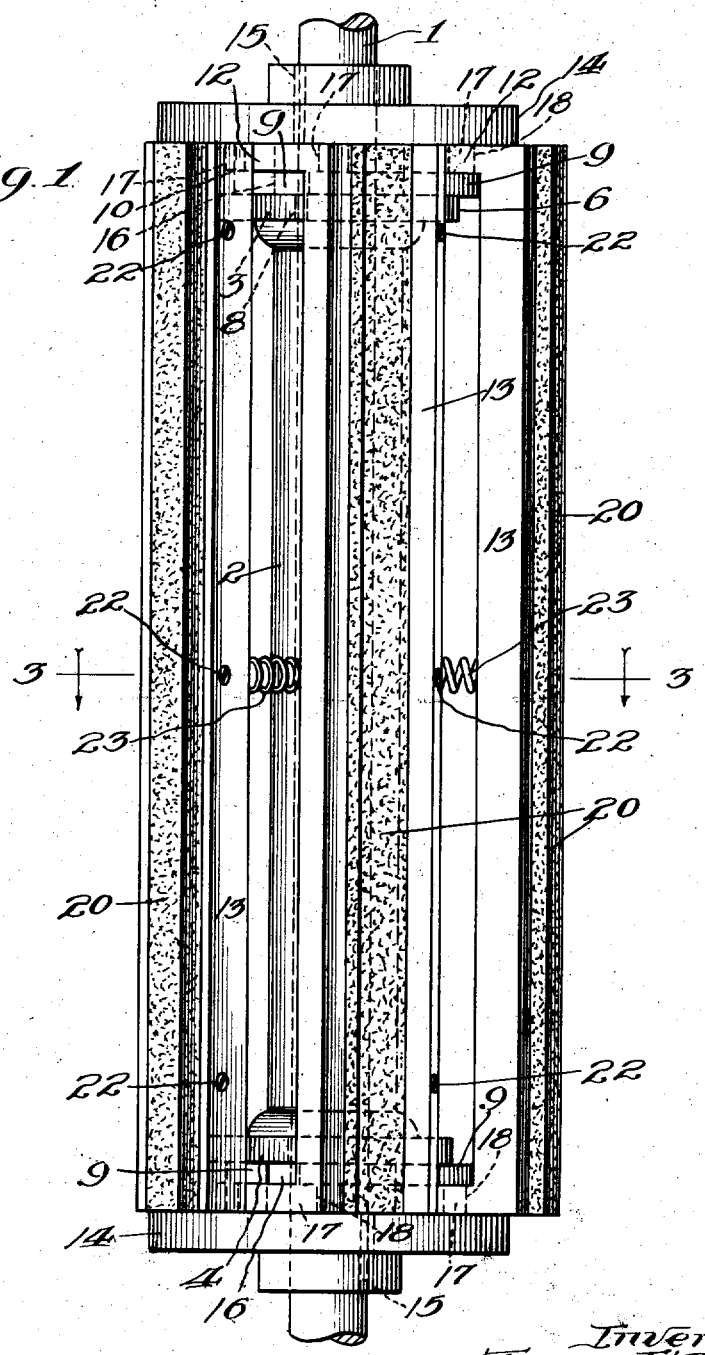
Figure 1 is a side elevation of the grinding device.
Figure 2:
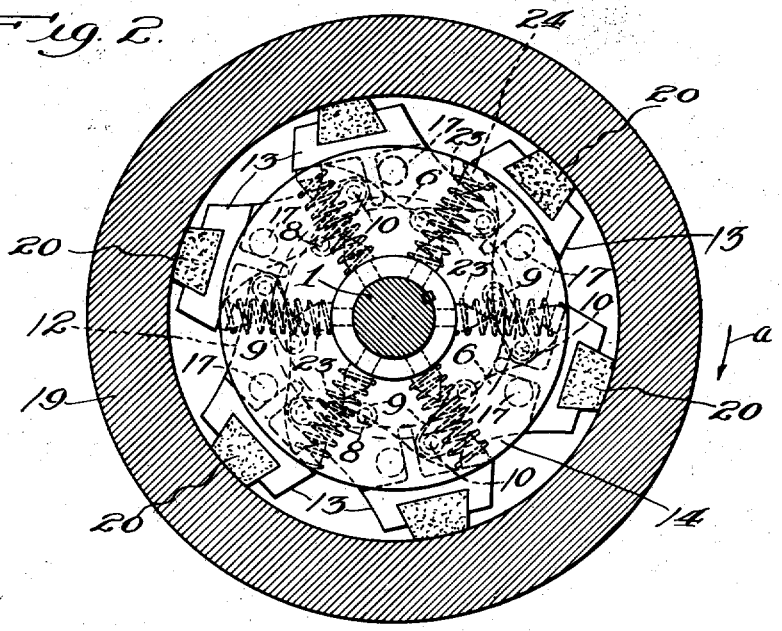
Figure 2 is a top elevation of the device showing the same disposed in a cylinder.
Figure 3:
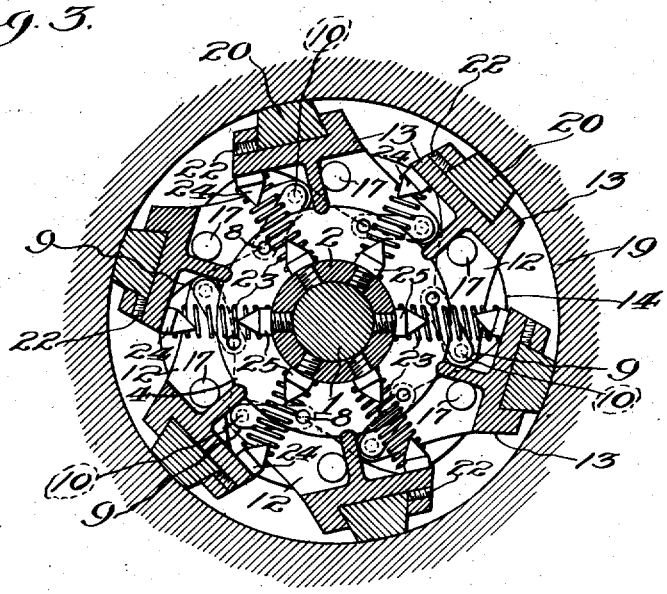
Figure 3 is a horizontal sectional view taken on line 3—3 of Figure 1.

Referring to the drawings, the numeral 1 designates the central shaft, herein shown in vertical position, which is rotated in any suitable manner for revolving the device as a whole during a cylinder grinding operation. Rotatably mounted on the shaft 1 is a sleeve 2, which sleeve at its upper and lower end-portions has horizontally-disposed discs 3 and 4. The disc 3 is provided with radially-disposed spaced recesses 5, and threaded on the outside of the discs 3 is a retaining ring 6, the purpose of which will presently appear. The lower disc 4 is provided with apertures 7 in axial alignment with the recesses 5. The recesses 5 and the apertures 7 receive the shafts or pivot pins 8 of links 9, which links are disposed on the outsides of discs 3 and 4. The other ends of the links 9 are provided with outwardly extending shafts or pivot pins 10 which are received in the apertures 11 of the arms 12, these arms being horizontally disposed and carried by the ends of the stone-carrying members or bars 13. These bars are in turn pivoted to discs 14, keyed at 15 to the upper and lower end-portions of the shaft 1, and are held spaced from the respective discs 3 and 4 by means of bosses 16 which extend outwardly from the discs. The arms 12 are pivoted to the discs 14 by means of inwardly extending cylindrical lugs 17, extending inwardly from the inner faces of the discs 14 and through the apertures 18 in the arms 12. Therefore, it will be seen, the stone carrying members 13 may move inwardly and outwardly on their pivotal points formed by the cylindrical lugs 17 to accommodate the device to different diameters of cylinders, and the movement of all of the several stone carriers must be equal and in unison. In use the device is rotated in the direction of the arrow *a* in Fig. 2 and during the rotation the wall of the cylinder 19 will be ground by the abrasive stones, preferably carborundum, which have a dove-tail connection 21 with the carrying-bars 13 and which are held against displacement by means of set screws 22. During the rotation of the device the stone carrying bars 13 are forced outwardly by means of coil springs 23, engaged at one end over lugs 24 carried by the bars 13 and engaged at the other end over removable lugs 25 carried by the sleeve 2, said springs being positioned preferably centrally of the device and radially disposed so that the maximum efficiency may be obtained as well as a compact structure. The springs exert an outward pressure upon the bars 13, thereby causing the grinding stones to engage the wall of the cylinder with adequate grinding pressure. By providing the retaining ring 6, after the lower end of the device is assembled, the upper end can be easily assembled and the lugs or pivot pins 8 of the links 9 at the upper end of the device may be passed into the recesses 5, and then the retaining ring 6 screwed on the disc 3 for holding said lugs against displacement.

It will be seen that the device will accommodate itself to various sizes of cylinders and that when the bars 13 move outwardly the links 9 will cause the sleeve 2 to rotate slightly according to the position of the bars, insuring equalized outward and inward movement of all of the bars in unison so that the abrasives grind to a true circle and—since both ends move alike—to a true cylinder-surface.

From the above it will be seen that a cylinder grinding device is provided which is simple in construction and effective in operation. It will also be seen that the grinding element may be easily and quickly removed and replaced if so desired.

The invention having been set forth, what is claimed as new and useful is:—

1. A cylinder grinder comprising a shaft, discs at the upper and lower ends of the shaft, inwardly extending lugs carried by said discs, the lugs of each disc being in axial alignment, a plurality of spaced grinding element carrying bars in parallel relation to the shaft, said bars having right angled arms pivoted to the axially aligned lugs of the discs, a sleeve rotatably mounted on the shaft, the arms of said bars extending beyond their pivotal points, discs carried by the sleeve, link connections between the ends of the arms of the bars and the sleeve carried discs and radially disposed springs interposed between the sleeve and the bars.

2. A cylinder grinder comprising a shaft, spaced discs carried adjacent the ends of the shaft, the outer discs being keyed to the shaft, the inner discs being rotatably mounted on the shaft, the inner discs being connected together by a sleeve mounted on the shaft, grinder carrying bars in parallel relation to the shaft, inwardly extending arms carried by the bars and pivoted intermediate their ends to the outer discs, link connections between the inner ends of the arms and the inner discs, and radially disposed springs interposed between the bars and the sleeve.

3. A cylinder grinder comprising a shaft, spaced discs adjacent the ends of said shaft, spaced bars in parallel relation to the shaft and pivoted to the outer disc, means for securing grinding elements in the bars, spring means for normally forcing said bars outwardly, link connections between arms of the bars and the inner discs, one of said inner discs being provided with a removable ring whereby the links may be connected to the discs and means whereby the inner discs will simultaneously rotate on the shaft to accommodate the springs to various sizes of cylinders.

4. A cylinder grinder comprising a driven member, a plurality of abrasive-holders carried by the driven member and arranged at points in a circle about the axis of said member, radially disposed springs for forcing said holders outwardly, and means connecting said holders and relatively movable about the axis of the driven member to enforce simultaneous movement of said holders, outwardly and inwardly.

5. A cylinder grinder comprising a driven member; a plurality of abrasive-holders carried in rotation thereby and each movable toward and from the axis of rotation thereof; an equalizing member rotatably movable with respect to and about the axis of said driven member; and positive connections between said holders and said equalizing member arranged and adapted to rotatably move said equalizing member as any holder is moved toward and from the axis, and to move all said holders in unison outwardly or inwardly as said equalizing member is rotatably moved with respect to said driven member.

6. A cylinder grinder comprising an axial driven member; a plurality of abrasive-holders carried thereby and arranged at points in a circle about the axis; a member rotatably movable relatively to and about the axis of the driven member and positioned against displacement along the axis of said driven member; and means connecting said rotatably movable member with said respective abrasive-holders arranged and adapted to rotatably move said member as any abrasive-holder is moved outwardly or inwardly and to move all of the abrasive-holders in unison outwardly or inwardly as said member is rotatively moved relatively to said driven member.

7. A cylinder grinder comprising a driven member; a plurality of abrasive-holders carried thereby and arranged at points of a circle about the axis of said driven member; equalizing means interconnecting said holders positively for movement thereof in unison both toward and from the axis and including links pivoted to said holders and a part to which the said links are pivotally connected, said part being rotatably movable relatively to and about the axis of said driven member in an unchanging plane at right angles to the axis of said driven member; and spring-means for forcing said abrasive-holders outwardly.

8. A cylinder grinder comprising an axial member to be driven, a plurality of abrasive-holders having their working faces parallel with and equi-distant from said axis and pivotally mounted with their pivotal centers parallel to the driven member for swinging movement of said holders transversely to the axis to increase or decrease their radial distance from the axis, and equalizing means interconnecting said holders positively to compel movement of all thereof in unison both toward and from the axis.

9. A cylinder grinder comprising an axial member to be driven, a plurality of abrasive-holders having their working faces parallel with and equi-distant from said axis and pivotally mounted with their pivotal centers parallel to the driven member for swinging movement of said holders transversely to the axis to increase or decrease their radial distance from the axis, and equalizing means adjacent each end of the abrasive-holders to compel movement of all thereof in unison both toward and from the axis.

10. A cylinder grinder comprising an axial member to be driven, a plurality of abrasive-holders carried thereby and pivotally mounted with respect thereto to swing toward and from the axis, said holders paralleling said axis at points of a circle concentric with the axis, an equalizing member positively connected with all of said abrasive holders and rotatably relatively movable about the axis of said member to be driven, and, to compel movement of said holders in unison both outwardly and inwardly, and spring means adapted and arranged to force said abrasive-holders outwardly.

11. A cylinder grinder comprising a driven member, a plurality of concentrically disposed, cranked abrasive-holders carried pivotally by the driven member, an equalizing member, and means connecting the equalizing member with the cranks of the abrasive-holders, said equalizing member movable relatively about the axis of said driven member to force said abrasive-holders to move in unison, both outwardly and inwardly.

12. A cylinder grinder comprising a driven member, a plurality of concentrically disposed parallel abrasive-holders carried pivotally by said driven member and each thereof having a crank, an equalizing member, and links, pivoted to said equalizing member and to said holder cranks, connecting all of said holder members with the equalizing member, said equalizing member oscillatable about the axis of the driven member to compel movement of the abrasive holders in unison both outwardly and inwardly.

JAMES EDWARD POWELL.